US011997464B2

(12) United States Patent
Yu

(10) Patent No.: US 11,997,464 B2
(45) Date of Patent: May 28, 2024

(54) LOUDSPEAKER, LOUDSPEAKER ASSEMBLY, AND PORTABLE ELECTRONIC DEVICE

(71) Applicant: Huawei Technologies Co., Ltd., Shenzhen (CN)

(72) Inventor: Ligang Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 17/434,159

(22) PCT Filed: Feb. 21, 2020

(86) PCT No.: PCT/CN2020/076135
§ 371 (c)(1),
(2) Date: Aug. 26, 2021

(87) PCT Pub. No.: WO2020/173395
PCT Pub. Date: Sep. 3, 2020

(65) Prior Publication Data

US 2022/0174409 A1 Jun. 2, 2022

(30) Foreign Application Priority Data

Feb. 26, 2019 (CN) ........................ 201910143771.9

(51) Int. Cl.
*H04R 9/06* (2006.01)
*H04R 9/02* (2006.01)

(52) U.S. Cl.
CPC .............. *H04R 9/025* (2013.01); *H04R 9/06* (2013.01)

(58) Field of Classification Search
CPC .......... H04R 9/025; H04R 9/00; H04R 9/063; H04R 9/06
(Continued)

(56) References Cited

U.S. PATENT DOCUMENTS

2003/0003945 A1* 1/2003 Saiki .................... H04R 1/025 381/178
2005/0111673 A1 5/2005 Rosen et al.
(Continued)

FOREIGN PATENT DOCUMENTS

CN 1722913 A 1/2006
CN 101180916 A 5/2008
(Continued)

*Primary Examiner* — George C Monikang
(74) *Attorney, Agent, or Firm* — Conley Rose, P.C.

(57) ABSTRACT

A loudspeaker includes a first diaphragm group, a second diaphragm group, and a first voice coil, a second voice coil, and a magnetic circuit system located between the first diaphragm group and the second diaphragm group. The first diaphragm group, the second diaphragm group, the first voice coil, and the second voice coil are disposed on a same center line. The first voice coil is disposed on the first diaphragm group. The second voice coil is disposed on the second diaphragm group. A magnetic field generated by the magnetic circuit system intersects with the center line. The first voice coil is spaced opposite to the second voice coil. The first voice coil and the second voice coil are at least partially located in the magnetic field generated by the magnetic circuit system, and have opposite vibration directions. The first voice coil and the second voice coil respectively provide vibration forces for the first diaphragm group and the second diaphragm group, so that the first diaphragm group and the second diaphragm group produce sound in two opposite directions.

20 Claims, 5 Drawing Sheets

(58) Field of Classification Search
USPC ................................ 381/332, 401, 412, 421
See application file for complete search history.

(56) References Cited

U.S. PATENT DOCUMENTS

| | | | |
|---|---|---|---|
| 2008/0044044 | A1 | 2/2008 | Madaffari et al. |
| 2008/0317255 | A1 | 12/2008 | Cozens et al. |
| 2016/0021441 | A1 | 1/2016 | Shao et al. |
| 2017/0272866 | A1 | 9/2017 | Griffiths |

FOREIGN PATENT DOCUMENTS

| | | | |
|---|---|---|---|
| CN | 203708472 | U | 7/2014 |
| CN | 204425645 | U | 6/2015 |
| CN | 205793302 | U | 12/2016 |
| CN | 206118013 | U | 4/2017 |
| CN | 108882089 | A | 11/2018 |
| CN | 109151680 | A | 1/2019 |
| CN | 109936803 | A | 6/2019 |

* cited by examiner

LOUDSPEAKER, LOUDSPEAKER ASSEMBLY, AND PORTABLE ELECTRONIC DEVICE

CROSS-REFERENCE TO RELATED APPLICATIONS

This application is a U.S. National Stage of International Patent Application No. PCT/CN2020/076135, filed on Feb. 21, 2020, which claims priority to Chinese Patent Application No. 201910143771.9, filed on Feb. 26, 2019. Both of the aforementioned applications are hereby incorporated by reference in their entireties.

This application claims priority to Chinese Patent Application No. 201910143771.9, filed with the China National Intellectual Property Administration on Feb. 26, 2019 and entitled "LOUDSPEAKER, LOUDSPEAKER ASSEMBLY, AND PORTABLE ELECTRONIC DEVICE", which is incorporated herein by reference in its entirety.

TECHNICAL FIELD

The present invention relates to the field of loudspeaker technologies, and in particular, to a loudspeaker and a loudspeaker assembly.

BACKGROUND

With development of portable electronic device technologies, people impose an increasingly high requirement on a sound effect of external playback of a portable electronic device such as a notebook computer. To improve a low frequency response of the notebook computer, an amplitude of a micro loudspeaker of the notebook computer is designed to be increasingly large. During application of a large amplitude, vibration of a voice coil and a diaphragm of the micro loudspeaker generates vibration excitation on a keyboard, affects experience of using the keyboard by a user, and causes a noise to affect sound quality of external playback. Currently, vibration of the keyboard is reduced by reducing an amplitude of the voice coil of the loudspeaker, but low frequency loudness is reduced and a sound effect is sacrificed at the same time.

SUMMARY

Embodiments of the present invention provide a loudspeaker, so that sound can be produced bidirectionally when there is a relatively large amplitude, to improve a sound effect of the loudspeaker.

The embodiments of the present invention further provide a loudspeaker assembly and a portable electronic device.

The loudspeaker provided in the embodiments of the present invention includes a first diaphragm group, a second diaphragm group, and a first voice coil, a second voice coil, and a magnetic circuit system that are located between the first diaphragm group and the second diaphragm group. The first diaphragm group, the second diaphragm group, the first voice coil, and the second voice coil are disposed on a same center line. The first voice coil is disposed on the first diaphragm group. The second voice coil is disposed on the second diaphragm group. A direction from a north pole to a south pole of a magnetic field generated by the magnetic circuit system is an extension direction of the center line. The first voice coil is spaced opposite to the second voice coil. In addition, the first voice coil and the second voice coil are both at least partially located in the magnetic circuit system, and have opposite vibration directions at a same moment under an action of the magnetic field generated by the magnetic circuit system. The first voice coil and the second voice coil respectively provide driving forces for the first diaphragm group and the second diaphragm group, so that the first diaphragm group and the second diaphragm group produce sound in two opposite directions at the same time. "The first voice coil and the second voice coil are both at least partially located in the magnetic circuit system" includes that positions of the first voice coil and the second voice coil are in the magnetic circuit system, and also includes that the first voice coil and the second voice coil are both at least partially located in the magnetic field generated by the magnetic circuit system.

According to the loudspeaker described in the present invention, the first voice coil and the second voice coil are used to respectively cooperate with the diaphragm groups to produce sound through bidirectional vibration in a same magnetic circuit. The first voice coil and the second voice coil have same vibration quality, and have opposite vibration directions during working, so that momentum changes $\Delta(mv)$ offset each other, and no vibration excitation is generated on a peripheral contact object. For an electronic product in which the loudspeaker is used, for example, a notebook computer, when the loudspeaker plays sound and a user uses a keyboard, vibration of the loudspeaker on a housing and the keyboard of the computer is greatly reduced, and even no vibration excitation is generated. More importantly, when sound is produced in two different directions, a vibration area is doubled, and an amplitude is reduced with a same loudness requirement, thereby helping reduce distortion.

Further, the first voice coil and the second voice coil have same quality and a same vibration speed, so that momentum changes $\Delta(mv)$ in two directions can totally offset each other, thereby further reducing a vibration force, and reducing a vibration impact on the keyboard. Certainly, the first voice coil and the second voice coil may have different quality and amplitudes.

Further, a radial size of the first voice coil in a direction perpendicular to the center line is different from a radial size of the second voice coil in the direction perpendicular to the center line. Certainly, the radial sizes of the first voice coil and the second voice coil may be the same. In a thickness direction from the first diaphragm group to the second diaphragm group, the first diaphragm group, the first voice coil, the second voice coil, and the second diaphragm group are sequentially disposed, and the first voice coil and the second voice coil are disposed in a staggered manner. In the thickness direction, overall thickness of the loudspeaker may be reduced. This is applicable to a portable lightening and thinning electronic device.

The magnetic circuit system includes an internal magnet, an external magnet, a first internal magnetic conductive plate, a second internal magnetic conductive plate, a first external magnetic conductive plate, and a second external magnetic conductive plate. The magnetic field enters the first internal magnetic conductive plate from the internal magnet, and is distributed around the first internal magnetic conductive plate. The distributed magnetic field enters the first external magnetic conductive plate, enters the external magnet from the first external magnetic conductive plate, then passes through the second external magnetic conductive plate, and enters the second internal magnetic conductive plate and then returns to the internal magnet. In some embodiments, a sound production unit formed by the first voice coil and the first diaphragm group shares a same magnetic circuit with a sound production unit formed by the second voice coil and the second diaphragm group, thereby reducing a quantity of magnets, and reducing overall thickness.

In an implementation, the magnetic circuit system includes vibration space. The first internal magnetic conductive plate, the internal magnet, and the second internal magnetic conductive plate are sequentially stacked. The first external magnetic conductive plate, the external magnet, and the second external magnetic conductive plate are sequentially stacked. The first external magnetic conductive plate is located on a periphery of the first internal magnetic conductive plate. The external magnet is located on a periphery of the internal magnet. The second external magnetic conductive plate is located on a periphery of the second internal magnetic conductive plate. The first external magnetic conductive plate and the first internal magnetic conductive plate, the external magnet and the internal magnet, and the second external magnetic conductive plate and the second internal magnetic conductive plate are all spaced from each other by the vibration space.

The first voice coil and the second voice coil are respectively located in the vibration space. The first voice coil surrounds a peripheral edge of the second internal magnetic conductive plate and a part of the internal magnet. The second voice coil surrounds the part of the internal magnet and the first internal magnetic conductive plate.

In another implementation, the first internal magnetic conductive plate includes a base plate and side plates connected to a peripheral edge of the base plate. The side plates and the base plate are assembled into a mounting slot. Free ends of the side plates extend outside the mounting slot to form the second external magnetic conductive plate parallel to the base plate. The internal magnet and the second internal magnetic conductive plate are sequentially stacked on a surface that is of the base plate and that is located in the mounting slot. The external magnet is disposed around a periphery of the side plates. The external magnet and the first external magnetic conductive plate are stacked on a side that is of the second external magnetic conductive plate and that faces away from the second internal magnetic conductive plate. The first internal magnetic conductive plate and the second external magnetic conductive plate are integrally formed, to facilitate assembly and fully use space in the loudspeaker.

The loudspeaker further includes a bracket that is formed by head-to-tail connecting a plurality of rod bodies and that accommodates and supports the magnetic circuit system. The bracket includes a first side surface and a second side surface opposite to the first side surface. A peripheral edge of the first diaphragm group is fastened to the first side surface, and the second diaphragm group is located on the second side surface. Abutting protrusions are disposed at intervals on a peripheral edge of a side of the second diaphragm group. The first external magnetic conductive plate, the external magnet, and the second external magnetic conductive plate are sandwiched between the second side surface of the bracket and the abutting protrusions. The bracket and the abutting protrusions jointly form space used to accommodate and support the internal magnet, the external magnet, the first internal magnetic conductive plate, the second internal magnetic conductive plate, the first external magnetic conductive plate, and the second external magnetic conductive plate, and are configured to bear the first diaphragm group and the second diaphragm group, to provide sufficient strength for the loudspeaker. Further, the first external magnetic conductive plate and the bracket are integrally formed.

Further, a plurality of protrusions are disposed at intervals on a peripheral edge of the second side surface. The first voice coil is provided with a first conductor. The second voice coil is provided with a second conductor. End faces of the two adjacent protrusions are provided with first terminals, and end faces of the other two abutting protrusions have second terminals. The first terminals and the second terminals are respectively electrically connected to the first conductor of the first voice coil and the second conductor of the second voice coil. The terminal is directly disposed on the protrusion to connect to the conductor of the voice coil, and is electrically connected to an external line, to facilitate a connection.

The first diaphragm group includes a first diaphragm and a first dome. The first diaphragm includes a peripheral surround and a first flat membrane in the middle. The first dome is bonded to the first flat membrane from the outside. The first voice coil is bonded to the first flat membrane in the middle of the diaphragm from the inside. The second diaphragm group includes a second diaphragm and a second dome. The second diaphragm includes a peripheral surround and a flat region in the middle. The second dome is bonded to the flat region in the middle of the diaphragm from the outside. The second voice coil is bonded to the flat region in the middle of the diaphragm from the inside. Orthographic projections of the first dome and the second dome on a same plane overlap, so that the first diaphragm group and the second diaphragm group separately produce sound without affecting each other.

The loudspeaker assembly provided in the embodiments of the present invention includes a housing and the loudspeaker. The housing includes a sound cavity and two sound output holes disposed at intervals. The loudspeaker is accommodated in the sound cavity, and the loudspeaker and the sound cavity form two independent sound transmission channels. The two sound output holes are respectively connected to the two sound transmission channels and the outside. A sound production unit formed by the first voice coil and the first diaphragm group and a sound production unit formed by the second voice coil and the second diaphragm group respectively emit volume by using the two sound output holes, so that volume can be increased.

The electronic device provided in the embodiments of the present invention includes the loudspeaker assembly and a circuit board electrically connected to the first voice coil and the second voice coil of the loudspeaker assembly. In an embodiment, the housing is a housing of the electronic device. The loudspeaker is relatively thin, can produce sound bidirectionally, does not occupy much space of the electronic device, and does not generate vibration excitation on the housing.

According to the loudspeaker of the present invention, the first voice coil and the second voice coil are used to respectively cooperate with the diaphragm groups to produce sound through bidirectional vibration in a same magnetic circuit, to avoid generating vibration excitation externally. In addition, vibration areas of the two diaphragms are doubled, and an amplitude is small with same loudness, thereby helping reduce distortion.

BRIEF DESCRIPTION OF DRAWINGS

To describe the technical solutions in the present invention more clearly, the following briefly describes the accompanying drawings required for describing the implementations. Apparently, the accompanying drawings in the following description show merely some implementations of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
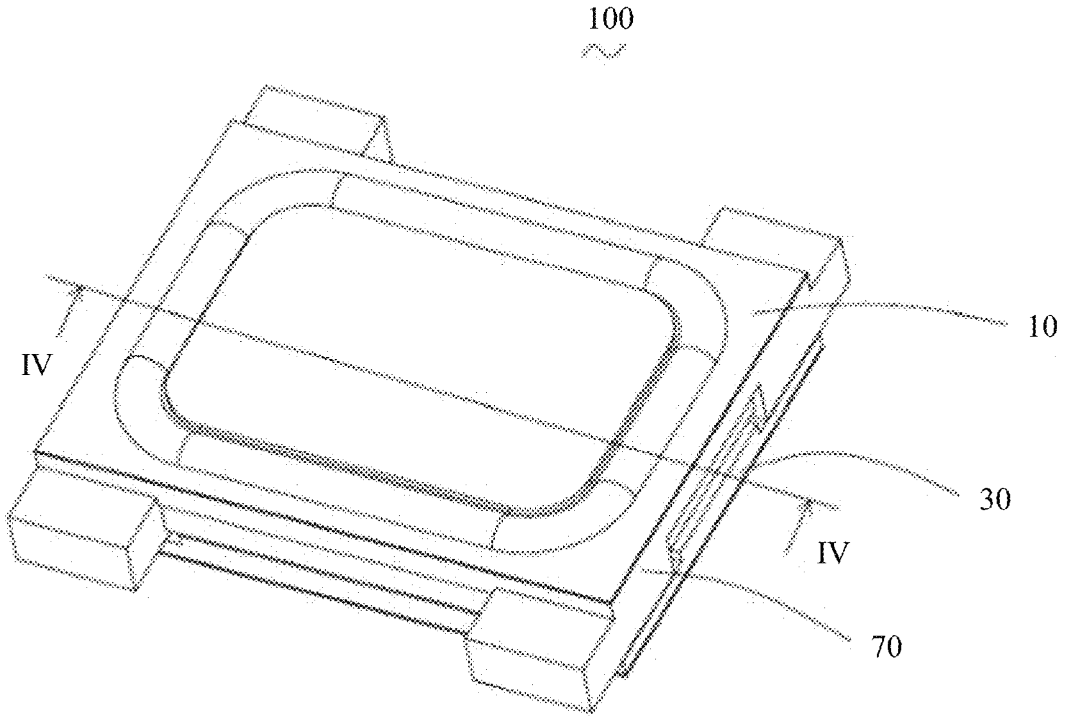
FIG. 1 is a schematic structural diagram of a loudspeaker according to the present invention.
Figure 2:
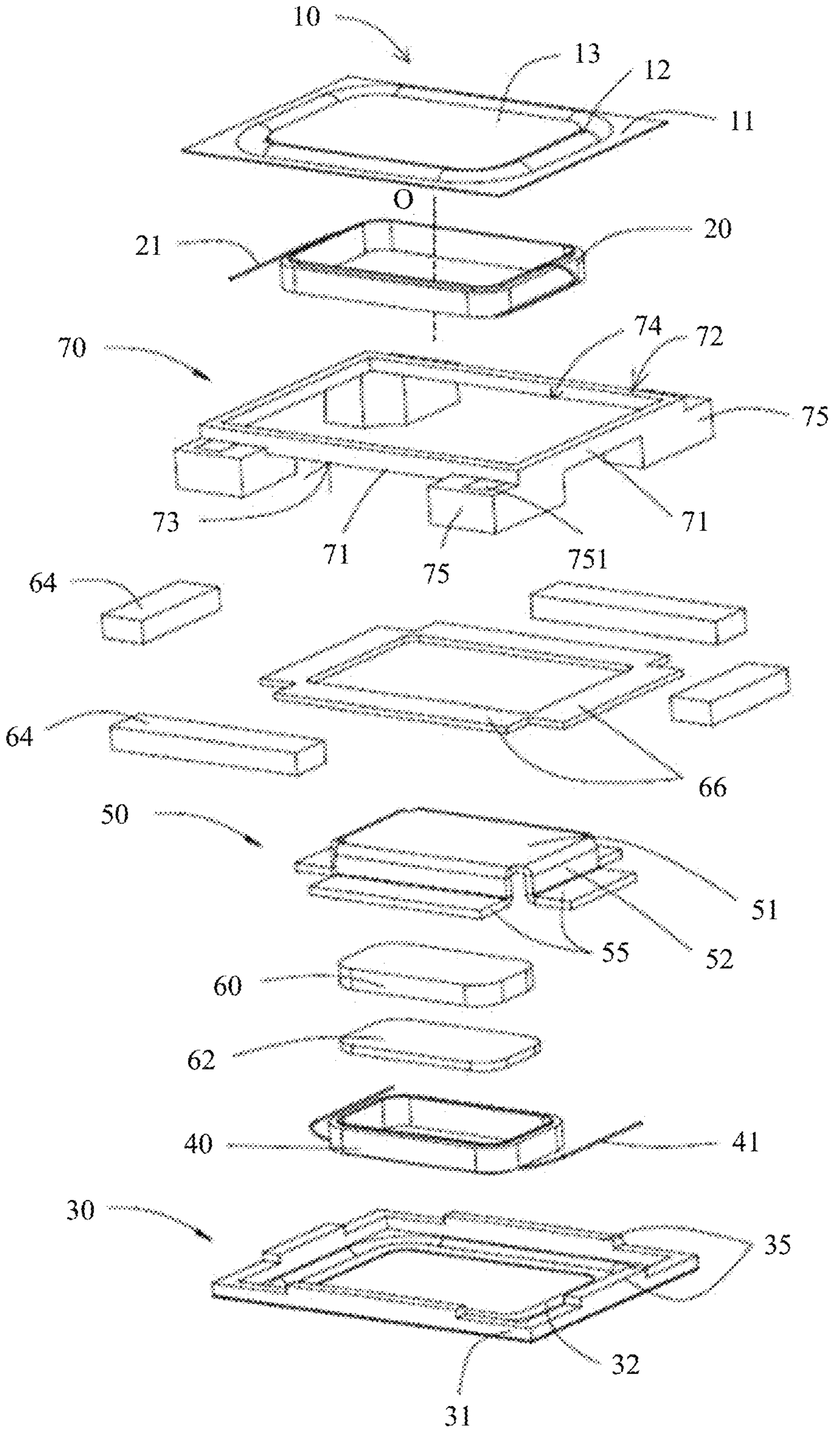
FIG. 2 is a schematic exploded view of a three-dimensional structure of the loudspeaker shown in FIG. 1.

Refer to FIG. 1 and FIG. 2. An embodiment of the present invention provides a loudspeaker that may be used in a portable electronic device such as a notebook computer to play volume. The loudspeaker 100 includes a first diaphragm group 10, a second diaphragm group 30, and a first voice coil 20, a second voice coil 40, and a magnetic circuit system that are located between the first diaphragm group 10 and the second diaphragm group 30. The first diaphragm group 10, the second diaphragm group 30, the first voice coil 20, and the second voice coil 40 are disposed on a same center line O. The first voice coil 20 is disposed on the first diaphragm group 10. The second voice coil 40 is disposed on the second diaphragm group 30. A magnetic field is formed in the magnetic circuit system. A direction from a north pole to a south pole of the generated magnetic field is an extension direction of the center line O. The first voice coil 20 is spaced opposite to the second voice coil 40. In addition, the first voice coil 20 and the second voice coil 40 are both at least partially located in the magnetic field generated by the magnetic circuit system, and vibration directions of the first voice coil 20 and the second voice coil 40 that are energized are opposite at a same moment. The first voice coil 20 and the second voice coil 40 vibrate to respectively provide driving forces for the first diaphragm group 10 and the second diaphragm group 30, so that the first diaphragm group 10 and the second diaphragm group 30 produce sound in two opposite directions at the same time, that is, the first voice coil 20 and the second voice coil 40 vibrate to respectively drive the first diaphragm group 10 and the second diaphragm group 30 to move, so that the first diaphragm group 10 and the second diaphragm group 30 produce sound. Further, the first voice coil 20 and the second voice coil 40 have same quality and a same vibration speed, so that momentum changes Δ(mv) in the two directions can totally offset each other, thereby further reducing a vibration force, and reducing a vibration impact on a keyboard.

According to the loudspeaker 100 described in the present invention, the first voice coil 20 and the second voice coil 40 are used to respectively cooperate with the diaphragm groups to produce sound through bidirectional vibration in a same magnetic circuit. The first voice coil 20 and the second voice coil 40 have the same vibration quality and speed, and have opposite vibration directions during working, so that the momentum changes Δ(mv) in the two directions offset each other, and no vibration excitation is generated on a peripheral contact object. In addition, the two diaphragms participate in sound production. Compared with a single diaphragm, a vibration area is doubled, and an amplitude is smaller with same loudness, thereby helping reduce distortion.

Figure 3:
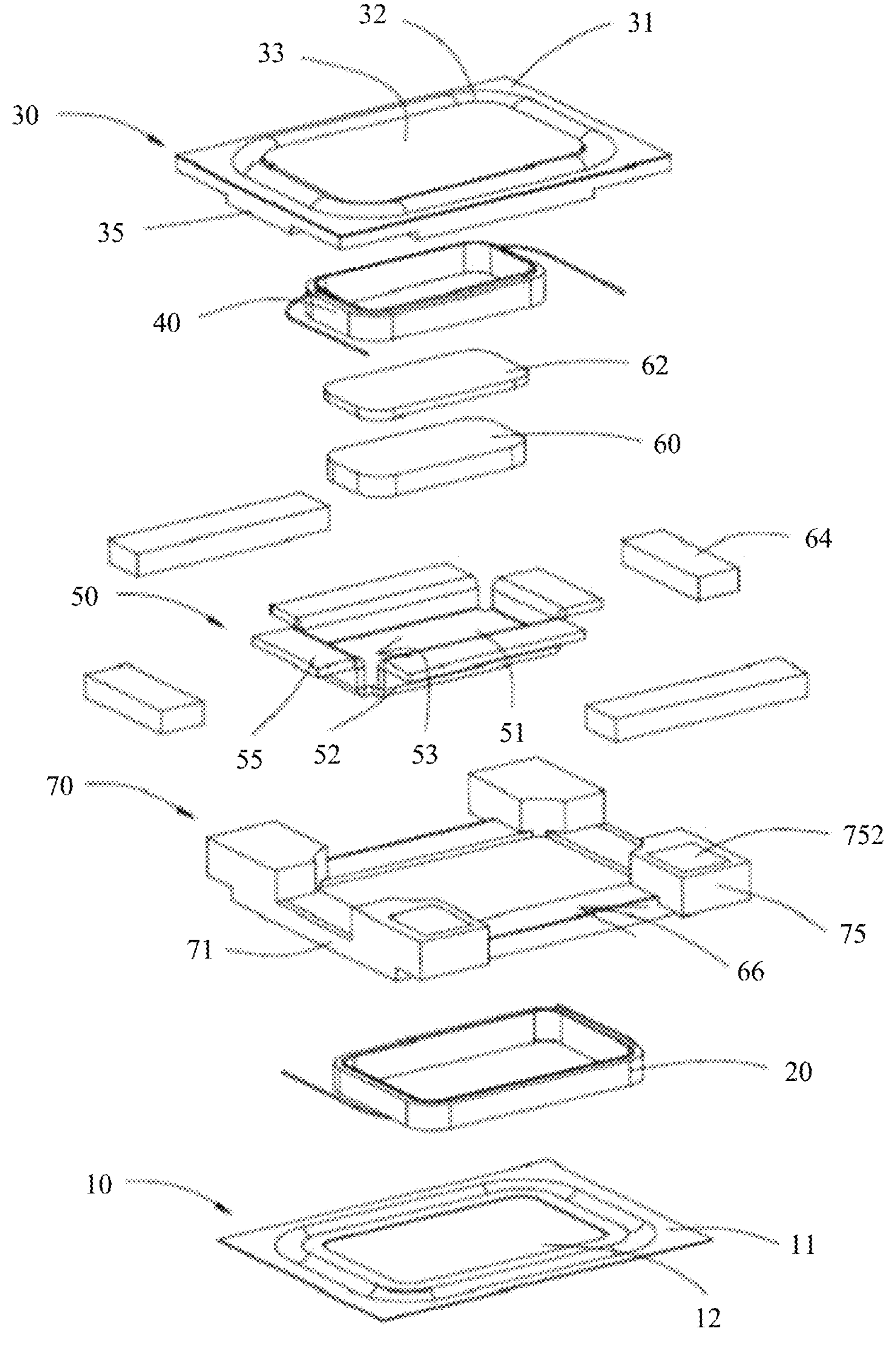
FIG. 3 is a schematic exploded view, from another perspective, of a three-dimensional structure of the loudspeaker shown in FIG. 1.
Figure 4:
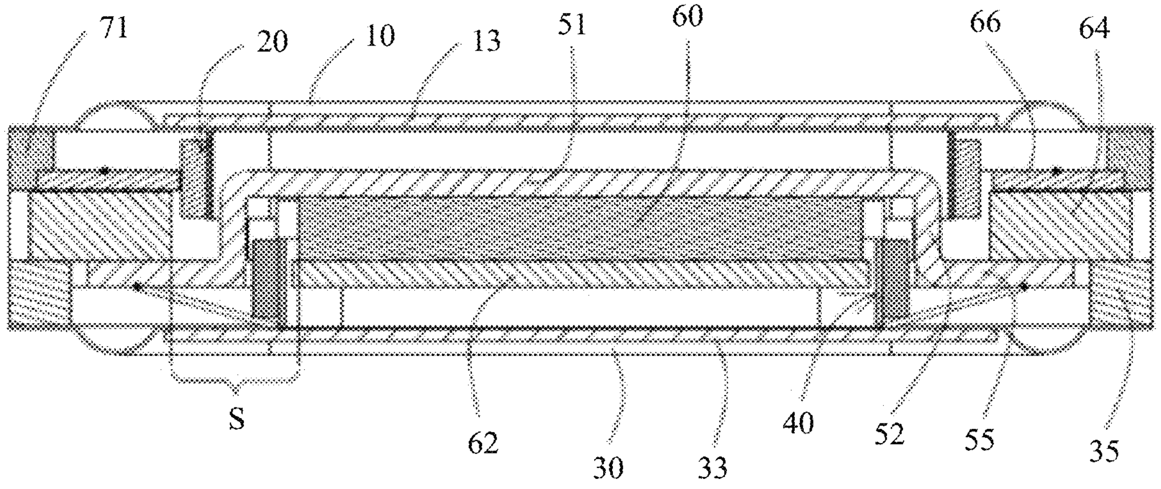
FIG. 4 is a cross-sectional schematic view, from an IV-IV perspective, of the loudspeaker shown in FIG. 1.

Refer to FIG. 3 and FIG. 4. In some embodiments of the present invention, the magnetic circuit system includes an internal magnet 60, external magnet 64, a first internal magnetic conductive plate 50, a second internal magnetic conductive plate 62, a first external magnetic conductive plate 66, and a second external magnetic conductive plate 55. A magnetic line of force in the internal magnet 60 enters the first internal magnetic conductive plate 50, and is distributed around the first internal magnetic conductive plate 50. The distributed magnetic field enters the first external magnetic conductive plate 66 at the same time, enters the external magnet 64 from the first external magnetic conductive plate 66, then passes through the second external magnetic conductive plate 55, and enters the second internal magnetic conductive plate 62 and then returns to the internal magnet 60. A sound production unit formed by the first voice coil 20 and the first diaphragm group 10 shares a same magnetic circuit with a sound production unit formed by the second voice coil 40 and the second diaphragm group 30 to implement driving. Compared with two magnetic circuits, no acting force of mutual rejection or attraction is generated, and magnetic conductive substrates of the two magnetic circuits do not need to be disposed additionally, thereby reducing a quantity of magnets, and reducing overall thickness. Further, the magnetic circuit system may include vibration space S. The first voice coil 20 and the second voice coil 40 are respectively located in the vibration space S. The first voice coil 20 surrounds a peripheral edge of the second internal magnetic conductive plate 62 and a part of the internal magnet 60. The second voice coil 40 surrounds the part of the internal magnet 60 and the first internal magnetic conductive plate 50.

Specifically, in an embodiment of the present invention, the first diaphragm group 10 includes a first diaphragm (not marked in the figure) and a first dome 13. The first diaphragm includes a surround 11 and a first flat membrane 12 surrounded by the surround 11. The first dome 13 is stacked on one side of the first flat membrane 12, and the first voice coil 20 surrounds the first flat membrane 12 and is located on the other side of the first flat membrane 12, where the other side may be specifically an inner side. The first surround 11 is disposed around a peripheral edge of the first flat membrane 12 and the first dome 13, and the first dome 13 covers the flat membrane 12. The first voice coil 20 is a rectangular ring body with one side connected to the peripheral edge of the flat membrane 12.

The second diaphragm group 30 includes a second diaphragm and a second dome 33. The second diaphragm includes a second flat membrane 32. The second dome 33 is stacked on one side of the second flat membrane 32, and the second voice coil 40 is bonded to a peripheral edge of the second flat membrane 32. Specifically, the second diaphragm may further include a second surround 31. The second surround 31 is disposed around the peripheral edge of the second flat membrane 32 and the second dome 33, and the second dome 33 covers the second membrane body 12. The second voice coil 40 may be a rectangular ring body with one side connected to the peripheral edge of the second flat membrane 32 and surrounding the second flat membrane 32. The first diaphragm group 10 and the second diaphragm group 30 respectively produce sound in opposite directions without affecting each other. Specifically, the first dome 13 and the second dome 33 may be planar.

Further, a radial size of the first voice coil 20 in a direction perpendicular to the center line is different from a radial size of the second voice coil 40 in the direction perpendicular to the center line. In some implementations of this embodiment, the first voice coil 20 and the second voice coil 40 are rectangular ring bodies. The extension direction of the center axial line is used as a longitudinal direction, and the radial size of the voice coil is sizes in all horizontal directions perpendicular to the longitudinal direction. Certainly, the radial sizes of the first voice coil 20 and the second voice coil 40 may be the same. In a thickness direction (the extension direction of the center axial line) from the first diaphragm group 10 to the second diaphragm group 30, the first diaphragm group 10, the first voice coil 20, the second voice coil 40, and the second diaphragm group 30 are sequentially disposed, and the radial sizes of the first voice coil 20 and the second voice coil 40 are different. The first voice coil 20 and the second voice coil 40 are disposed in a staggered manner, and occupy relatively small space in the thickness direction, so that overall thickness of the loudspeaker 100 can be reduced. This is applicable to a portable lightening and thinning electronic device. The first voice coil 20 is provided with two leads configured to electrically connect the first voice coil 20 to a power supply, for example, a power supply system such as a battery of a computer. The electrical connection includes a direct electrical connection or an electrical connection implemented between the lead and the power supply in another manner. For example, the lead may be connected to the power supply by using a circuit board (a specific power supply circuit). In some embodiments, the first voice coil 20 and the second voice coil 40 may be respectively provided with leads on two opposite sides. The two opposite sides may be outer sides or inner sides of the voice coils. This is determined based on an actual design requirement. Further, positive electrodes of leads of the first voice coil 20 and the second voice coil 40 may be connected to a same feed point. A same current enters each of the lead of the first voice coil 20 and the lead of the second voice coil 40 from the feed point. Directions of currents entering the first voice coil 20 and the second voice coil 40 are the same, that is, phases are the same, and directions of magnetic fields entering the first voice coil 20 and the second voice coil 40 are opposite, so that the vibration directions of the first voice coil 20 and the second voice coil 40 are opposite, and the first diaphragm group 10 and the second diaphragm group 30 produce sound in opposite directions.

In some embodiments, the first internal magnetic conductive plate 50, the internal magnet 60, and the second internal magnetic conductive plate 62 are sequentially stacked. The first external magnetic conductive plate 66, the external magnet 64, and the second external magnetic conductive plate 55 are sequentially stacked. The first external magnetic conductive plate 66 is located on a periphery of the first internal magnetic conductive plate 50. The external magnet 64 is located on a periphery of the internal magnet 60. The second external magnetic conductive plate 55 is located on a periphery of the second internal magnetic conductive plate 62. In addition, the first external magnetic conductive plate 66 and the first internal magnetic conductive plate 50, the external magnet 64 and the internal magnet 60, and the second external magnetic conductive plate 55 and the second internal magnetic conductive plate 62 are all spaced from each other by the vibration space S. Specifically, the first internal magnetic conductive plate 50, the internal magnet 60, and the second internal magnetic conductive plate 62 are respectively rectangular plate bodies. The first external magnetic conductive plate 66, the external magnet 64, and the second external magnetic conductive plate 55 are respectively four rectangular strip-shaped plate bodies. In this implementation, the four external magnets 64 are disposed at intervals, the four second external magnetic conductive plates 55 are disposed at intervals, and the four first external magnetic conductive plates 66 are sequentially head-to-tail connected to form a rectangular plate-shaped frame structure. Certainly, the four first external magnetic conductive plates 66 may not be connected to each other, to further help form the magnetic circuit. The external magnet 64 is sandwiched between the first external magnetic conductive plate 66 and the second external magnetic conductive plate 55. There is a first gap between the first external magnetic conductive plate 66 and the periphery of the first internal magnetic conductive plate 50. There is a second gap between the external magnet 64 and the periphery of the internal magnet 60. There is a third gap between the second external magnetic conductive plate 55 and the periphery of the second internal magnetic plate 62. In a direction from the first voice coil 20 to the second voice coil 40, the first gap, the second gap, and the third gap are connected to each other to form the vibration space S.

Figure 5:
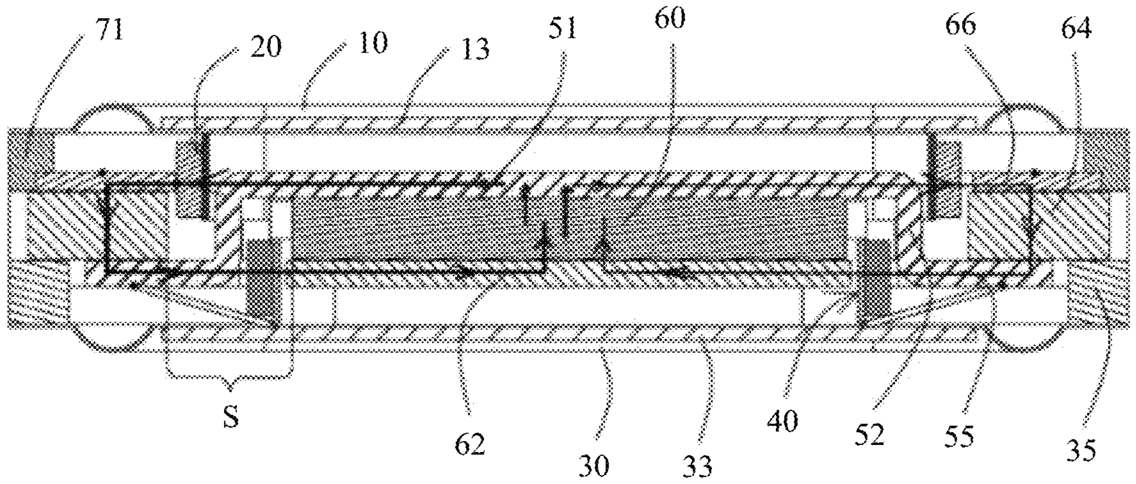
FIG. 5 is a schematic diagram of a direction of a magnetic field in the loudspeaker shown in FIG. 1.

Refer to FIG. 4 and FIG. 5. The first voice coil 20 is located in a direction in which the first diaphragm faces the second diaphragm group 30, and extends into the vibration space S in a direction from the first diaphragm group 10 to the second diaphragm group 30. The second voice coil 40 is located in a direction in which the second diaphragm faces the first diaphragm group 10, and extends into the vibration space S in a direction from the second diaphragm group 30 to the first diaphragm group 10. In some embodiments, the first voice coil 20 and the second voice coil 40 are disposed in a staggered manner, so that no collision occurs, and a distance between the first diaphragm group 10 and the second diaphragm group 30 is not increased. After the first voice coil 20 and the second voice coil 40 are energized, as shown in FIG. 5, an arrow direction is a direction of a magnetic field (a magnetic line of force). A magnetic field generated in the internal magnet 60 enters the first internal magnetic conductive plate 50 from the internal magnet 60, and is distributed around the first internal magnetic conductive plate 50. The distributed magnetic field enters the four first external magnetic conductive plates 66 at the same time, enters the four external magnets 64 from the first external magnetic conductive plates 66, then enters the four second external magnetic conductive plates 55, and returns to the internal magnet 60 from the second internal magnetic conductive plate 62, to implement a closed magnetic field, namely, a magnetic loop. The magnetic field enters in a direction perpendicular to the center axial line of the first voice coil 20 and the second voice coil 40, so that the first voice coil 20 and the second voice coil 40 vibrate to drive the first diaphragm group 10 and the second diaphragm group 30 to vibrate to produce sound. A sound production unit that is formed by the first voice coil 20 and the first diaphragm group 10 and that is in a first direction shares a same magnetic circuit with a sound production unit that is jointly formed by the second voice coil 40 and the second diaphragm group 30 and that is in a second direction, that is, the sound production unit formed by the first voice coil and the first diaphragm group shares a same magnetic circuit with the sound production unit formed by the second voice coil and the second diaphragm group, thereby reducing a quantity of magnets, and reducing overall thickness.

As shown in FIG. 3, in some embodiments of the present invention, the first internal magnetic conductive plate 50 and the second external magnetic conductive plate 55 have an integral structure, and the first internal magnetic conductive plate 50 includes a base plate 51 and side plates 52 connected to a peripheral edge of the base plate 51. In some embodiments, the side plates 52 are vertically connected to the base plate 51, and the side plates 52 and the base plate 51 are assembled into a mounting slot 53, thereby saving horizontal space. Free ends of the side plates 52 extend outside the mounting slot 53 to form the second external magnetic conductive plate 55 parallel to the base plate 51. The mounting slot 53 is rectangular, and the four second external magnetic conductive plates 55 are not connected to each other. The internal magnet 60 and the second internal magnetic conductive plate 62 are sequentially stacked on a surface that is of the base plate 51 and that is located in the mounting slot 53. The external magnet 64 is disposed around a periphery of the side plates 52. The external magnet 64 and the first external magnetic conductive plate 66 are stacked on a side that is of the second external magnetic conductive plate 55 and that faces away from the second internal magnetic conductive plate 62. It may be understood that the first external magnetic conductive plate 66 is disposed around the peripheral edge of the side plates 52. The side plates 52 extend in the direction from the first voice coil 20 to the second voice coil 40, and are located in the vibration space S to separate the first voice coil 20 and the second voice coil. The first internal magnetic conductive plate 50 and the second external magnetic conductive plate 55 are integrally formed, to facilitate assembly and fully use space in the loudspeaker 100.

In some other embodiments, the second external magnetic conductive plate 55 and the first internal magnetic conductive plate 50 are independent of each other. In some embodiments, the side plates 52 are ring-shaped, the first internal magnetic conductive plate 50 is plate-shaped, the second external magnetic conductive plate 55 is four independent plate bodies or block bodies with assembly positions unchanged, and the first magnetic conductive plate and the side plates are adhesively fastened.

As shown in FIG. 3 and FIG. 4, in some embodiments of the present invention, the loudspeaker 100 further includes a bracket 70 that is formed by head-to-tail connecting a plurality of rod bodies 71 and that accommodates and supports the magnetic circuit system. The bracket 70 includes a first side surface 72 and a second side surface 73 opposite to the first side surface 72. A peripheral edge of the first diaphragm group 10 is fastened to the first side surface 72. The second diaphragm group 30 is located on the second side surface 73. Abutting protrusions 35 are disposed at intervals on a peripheral edge of a side of the second diaphragm group 30. The first external magnetic conductive plate 66, the external magnet 64, and the second external magnetic conductive plate 55 are sandwiched between the second side surface 73 of the bracket 70 and the abutting protrusions 35. The bracket 70 and the abutting protrusions 35 jointly form space used to accommodate and support the internal magnet 60, the external magnet 64, the first internal magnetic conductive plate 50, the second internal magnetic conductive plate 62, the first external magnetic conductive plate 66, and the second external magnetic conductive plate 55, and are configured to bear the first diaphragm group 10 and the second diaphragm group 30, to provide sufficient strength for the loudspeaker 100.

Specifically, the abutting protrusions 35 are disposed at intervals on a peripheral edge of a side that is of the second body 31 of the second diaphragm group 30 and on which the second diaphragm is disposed, and are specifically located at middle positions of four edges. The bracket 70 is a rectangular frame body, and is formed by head-to-tail connecting the four rod bodies 71. Accommodation space 74 is surrounded by the four rod bodies 71. Cross sections of the four rod bodies 71 are rectangular, so that the bracket 70 has specific thickness, and the accommodation space 74 has a specific volume. The four rod bodies 71 are in a one-to-one correspondence with the four abutting protrusions 35. The first side surface 72 is a side on which the four rod bodies 71 face the first diaphragm group 10, and the second side surface 73 is a side on which the four rod bodies 71 face the second diaphragm group 30. In some embodiments of the present invention, a plurality of protrusions 75 are disposed at intervals on a peripheral edge of the second side surface 73. The protrusions 75 are four protrusions that are each located at a position at which every two connected rod bodies 71 are connected. The protrusions 75 protrude from the first side surface 72, and protrude from the rod bodies 71 by extending in a direction away from the accommodation space 74. In some embodiments of the present invention, the first voice coil 20 and the second voice coil 40 are rectangular ring bodies with arc-shaped corners. To avoid corner positions on the first voice coil 20 and the second voice coil 40, positions that are on the protrusions 75 and that face the accommodation space 74 are designed with concave arc surfaces.

Further, the first voice coil 20 is provided with a first conductor 21. The second voice coil 40 is provided with a second conductor 41. End faces of the two adjacent protrusions 75 in a direction of the first side surface 72 are both provided with first terminals 751, and the first terminal is located on a surface of a part that is of the protrusion 75 and that extends out of the bracket 70. End faces of the other two adjacent abutting protrusions 75 in a direction of the second side surface 73 are both provided with second terminals 752. The first terminals and the second terminals are respectively electrically connected to the first conductor of the first voice coil 20 and the second conductor of the second voice coil 40. The terminal is directly disposed on the protrusion 75 to connect to the conductor of the voice coil, and is electrically connected to an external line, to facilitate a connection. In addition, the terminal and the conductor are encapsulated by using the first diaphragm group 10 and the second diaphragm group 30. Refer to FIG. 4. The first external magnetic conductive plate 66 and the bracket 70 are integrally formed. Specifically, a step is disposed on a side that is of the rod body 71 and that is located in the accommodation space 74, and the first external magnetic conductive plate 66 is formed on the step. The protrusion 75 may press against a position at which every two first external magnetic conductive plates 66 are connected. Certainly, the first external magnetic conductive plate 66 and the bracket 70 may be adhesively fastened.

As shown in FIG. 4 and FIG. 5, the first body 11 of the first diaphragm group 10 is attached to the first side surface 72. The first voice coil 20 extends into the accommodation space 74. The first external magnetic conductive plate 66 is located between every two protrusions 75 on the second side surface 73 of the bracket 70, and the first external magnetic conductive plates 66 surround the outside of the first voice coil 20 and are supported by the second side surface 73 of the bracket 70. There is a gap between two adjacent external magnetic conductive plates for avoiding the protrusion 75. The external magnet 64 is disposed on a surface of the first external magnetic conductive plate 66, and is disposed to be spaced from the first voice coil 20. The first external magnetic conductive plate 66 and the external magnet 64 are adhesively fastened. The first internal magnetic conductive plate 50 is disposed on the bracket 70 in the direction of the second side surface 73. The base plate 71 and the side plates 72 are accommodated in the accommodation space 74. A part of the side plates 72 extend into the first voice coil 20, and are spaced from the first voice coil 20. The second external magnetic conductive plate 55 is abutted on and is adhesively fastened to a part of a surface of the external magnet 64. Finally, the second body 31 of the second diaphragm group 30 covers the second side surface 73. The abutting protrusion 35 is located between two protrusions 75, and is abutted on and fastened to the surface of the external magnet 64. The second external magnetic conductive plate 55 is sandwiched between the second body 31 of the second diaphragm group 30 and the external magnet 64. The external magnet 64 is sandwiched between the second external magnetic conductive plate 55 and the first external magnetic conductive plate 66, and the external magnet 64 is also sandwiched between the abutting protrusion and the first external magnetic conductive plate 66. The second external magnetic conductive plate 55 and the abutting protrusion 35 are located on a same surface of the external magnet 64. Certainly, the internal magnet 60 and the second internal magnetic conductive plates 62 are first fastened to the first internal magnetic conductive plate 50, and the external magnet 64 is first fixedly connected to the second external magnetic conductive plate 55, that is, the internal magnet 60, the external magnet 64, the second internal magnetic conductive plate 62, and the first internal magnetic conductive plate 50 are assembled with the bracket 70 as a whole.

Figure 6:
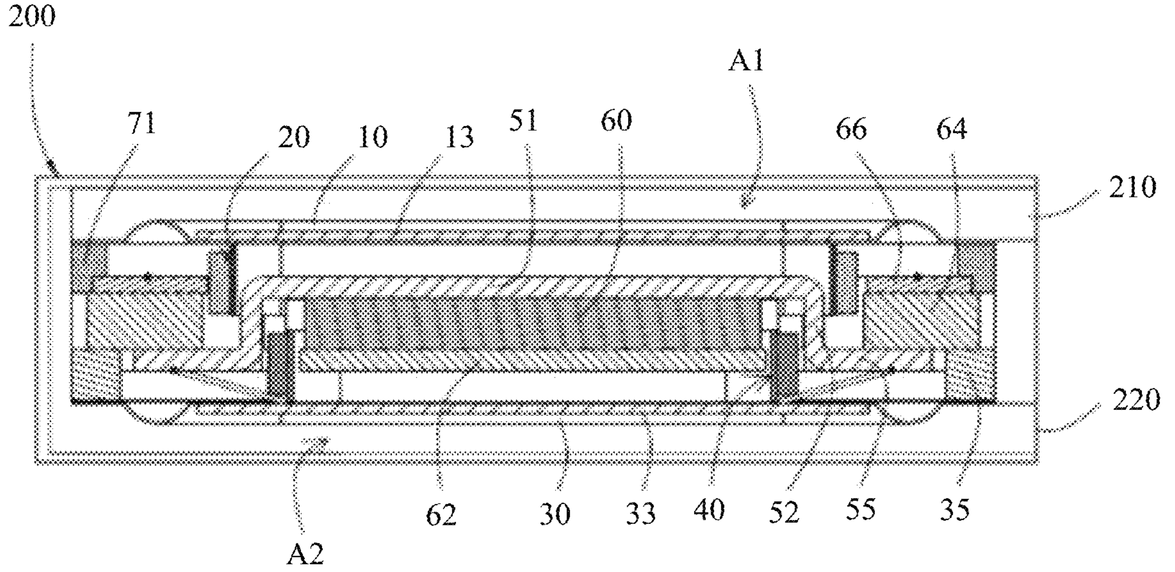
FIG. 6 is a schematic structural diagram of a loudspeaker assembly according to the present invention.

Refer to FIG. 6. An embodiment of the present invention provides a loudspeaker assembly including a housing 200 and the loudspeaker 100. The housing 200 includes a sound cavity and two sound output holes 210 and 220 disposed at intervals. The loudspeaker 100 is accommodated in the sound cavity, and the loudspeaker 100 and the sound cavity form two independent sound transmission channels A1 and A2. The sound output hole 210 and the sound output hole 220 are respectively connected to the sound transmission channel A1, the sound transmission channel A2, and the outside. A sound production unit formed by the first voice coil 20 and the first diaphragm group 10 and a sound production unit formed by the second voice coil 40 and the second diaphragm group 30 respectively transmit volume to the outside by using the sound transmission channel A1 and the sound transmission channel A2 and then the sound output hole 210 and the sound output hole 220. A dual channel loudspeaker assembly can improve sound effect quality.

Figure 7:
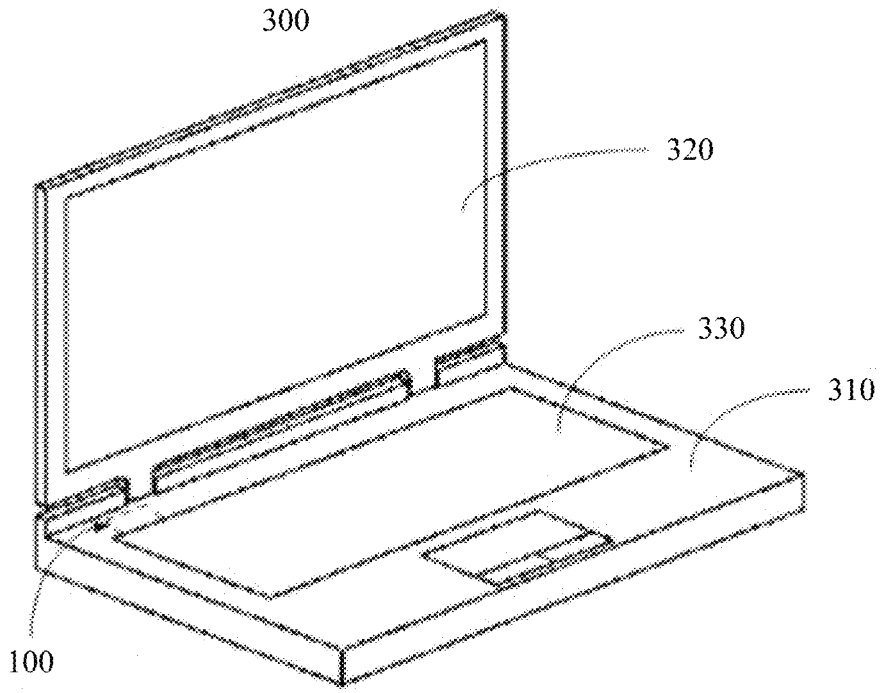
FIG. 7 is a schematic structural diagram of an electronic device according to the present invention.

Refer to FIG. 7. An electronic device provided in an embodiment of the present invention includes the loudspeaker assembly 100 and a circuit board electrically connected to the first voice coil 20 and the second voice coil 40 of the loudspeaker assembly. In an embodiment, the electronic device is a notebook computer, and the housing is a housing of a body of the notebook computer. The notebook computer 300 includes a body 310, a screen 320, and a keyboard 330 located on the body 310. The loudspeaker assembly 100 is located at any position on a side of the keyboard on the body 310, for example, in an upper part of the keyboard shown in the figure. The housing is a housing of the body 310. The loudspeaker 100 is relatively thin, can produce sound bidirectionally, and does not occupy much space of the notebook computer. In addition, the first voice coil 20 and the second voice coil 40 have opposite vibration directions during working, so that momentum changes $\Delta(mv)$ offset each other, and vibration excitation on the housing of the notebook computer is relatively small or even no vibration excitation is generated. When the loudspeaker 100 plays sound and a user uses the keyboard, vibration space S of the loudspeaker 100 on the housing and the keyboard of the computer is greatly reduced, thereby ensuring user experience and improving sound effect quality.

The embodiments of the present invention are described in detail above. The principle and implementations of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A loudspeaker comprising:

a first diaphragm group;

a second diaphragm group;

a first voice coil disposed on the first diaphragm group;

a second voice coil disposed on the second diaphragm group, wherein the first voice coil is spaced opposite to the second voice coil; and a magnetic circuit system configured to generate a magnetic field comprising a north pole and a south pole, wherein the first voice coil and the second voice coil are at least partially located in the magnetic circuit system, wherein the first voice coil, the second voice coil, and the magnetic circuit system are located between the first diaphragm group and the second diaphragm group, wherein the first diaphragm group, the second diaphragm group, the first voice coil, and the second voice coil are disposed on a same center line, wherein a direction from the north pole to the south pole is an extension direction of the center line, wherein a radial size of the first voice coil in a direction perpendicular to the center line is different from a radial size of the second voice coil in the direction perpendicular to the center line, wherein the first voice coil and the second voice coil are configured to have opposite vibration directions at a same moment under an action of the magnetic field, and wherein the first voice coil and the second voice coil are configured to vibrate to respectively provide driving forces for the first diaphragm group and the second diaphragm group and cause the first diaphragm group and the second diaphragm group to produce sound in two opposite directions at the same time.

2. The loudspeaker according to claim 1, wherein the first voice coil and the second voice coil have a same vibration speed.

3. The loudspeaker according to claim 1, wherein the magnetic circuit system comprises an internal magnet, an external magnet, a first internal magnetic conductive plate, a second internal magnetic conductive plate, a first external magnetic conductive plate, and a second external magnetic conductive plate, wherein a magnetic line of force of the magnetic field generated by the magnetic circuit system enters the first internal magnetic conductive plate from the internal magnet and is distributed around the first internal magnetic conductive plate, and wherein the magnetic line of force of the magnetic field that enters the first external magnetic conductive plate further enters the external magnet from the first external magnetic conductive plate, passes through the second external magnetic conductive plate, enters the second internal magnetic conductive plate, and then returns to the internal magnet.

4. The loudspeaker according to claim 3, wherein the magnetic circuit system comprises a vibration space, wherein the first internal magnetic conductive plate, the internal magnet, and the second internal magnetic conductive plate are directly stacked, wherein the first external magnetic conductive plate, the external magnet, and the second external magnetic conductive plate are directly stacked, wherein the first external magnetic conductive plate is located on a periphery of the first internal magnetic conductive plate, wherein the external magnet is located on a periphery of the internal magnet, wherein the second external magnetic conductive plate is located on a periphery of the second internal magnetic conductive plate, wherein the first external magnetic conductive plate, the first internal magnetic conductive plate, the external magnet, the internal magnet, the second external magnetic conductive plate, and the second internal magnetic conductive plate are spaced from each other by the vibration space, wherein the first voice coil and the second voice coil are located in the vibration space, wherein the first voice coil surrounds a peripheral edge of the second internal magnetic conductive plate and a part of the internal magnet, and wherein the second voice coil surrounds the part of the internal magnet and the first internal magnetic conductive plate.

5. The loudspeaker according to claim 4, wherein the first internal magnetic conductive plate comprises a base plate and side plates connected to a peripheral edge of the base plate, wherein the side plates and the base plate are assembled into a mounting slot, wherein free ends of the side plates extend outside the mounting slot to form the second external magnetic conductive plate parallel to the base plate, wherein the internal magnet and the second internal magnetic conductive plate are directly stacked on a surface of the base plate that is located in the mounting slot, wherein the external magnet is disposed around a periphery of the side plates and is disposed to be spaced from the side plates, and wherein the external magnet and the first external magnetic conductive plate are stacked on a side of the second external magnetic conductive plate that faces away from the second internal magnetic conductive plate.

6. The loudspeaker according to claim 3, wherein the loudspeaker further comprises a bracket for supporting the magnetic circuit system, wherein the bracket comprises a first side surface and a second side surface opposite to the first side surface, wherein the first diaphragm group is fastened to the first side surface, wherein the second diaphragm group is located on the second side surface, wherein abutting protrusions are disposed at intervals on a peripheral edge of a side of the second diaphragm group, wherein the first external magnetic conductive plate, the external magnet, and the second external magnetic conductive plate are positioned between the second side surface of the bracket and the abutting protrusions.

7. The loudspeaker according to claim 6, wherein a plurality of protrusions are disposed at intervals on a peripheral edge of the second side surface, wherein the first voice coil is provided with a first conductor, wherein the second voice coil is provided with a second conductor, wherein end faces of two abutting protrusions of the plurality of protrusions are provided with first terminals, wherein end faces of other two abutting protrusions of the plurality of protrusions have second terminals, and wherein the first terminals and the second terminals are respectively electrically connected to the first conductor of the first voice coil and the second conductor of the second voice coil.

8. The loudspeaker according to claim 1, wherein the first diaphragm group comprises a first diaphragm and a first dome, wherein the first diaphragm comprises a peripheral surround and a first flat membrane surrounded by the peripheral surround, wherein the first dome is stacked on a first side of the first flat membrane, wherein the first voice coil surrounds the first flat membrane and is located on a second side of the first flat membrane, wherein the second diaphragm group comprises a second diaphragm and a second dome, wherein the second diaphragm comprises a second flat membrane, wherein the second dome is stacked on a first side of the second flat membrane, and wherein the second voice coil surrounds the second flat membrane and is located on a second side of the second flat membrane.

9. A loudspeaker assembly comprising:

a loudspeaker wherein the loudspeaker comprises:

- a first diaphragm group;
- a second diaphragm group;
- a first voice coil disposed on the first diaphragm group;
- a second voice coil disposed on the second diaphragm group, wherein the first voice coil is spaced opposite to the second voice coil; and
- a magnetic circuit system configured to generate a magnetic field comprising a north pole and a south pole,
- wherein the magnetic circuit system comprises an internal magnet, an external magnet, a first internal magnetic conductive plate, a second internal magnetic conductive plate, a first external magnetic conductive plate, and a second external magnetic conductive plate,
- wherein a magnetic line of force of the magnetic field generated by the magnetic circuit system enters the first internal magnetic conductive plate from the internal magnet and is distributed around the first internal magnetic conductive plate,
- wherein the magnetic line of force of the magnetic field that enters the first external magnetic conductive plate further enters the external magnet from the first external magnetic conductive plate, passes through the second external magnetic conductive plate, enters the second internal magnetic conductive plate, and then returns to the internal magnet,
- wherein the first voice coil and the second voice coil are at least partially located in the magnetic circuit system,
- wherein the first voice coil, the second voice coil, and the magnetic circuit system are located between the first diaphragm group and the second diaphragm group, wherein the first diaphragm group, the second diaphragm group, the first voice coil, and the second voice coil are disposed on a same center line, wherein a direction from the north pole to the south pole is an extension direction of the center line, wherein the first voice coil and the second voice coil are configured to have opposite vibration directions at a same moment under an action of the magnetic field, and wherein the first voice coil and the second voice coil are configured to vibrate to respectively provide driving forces for the first diaphragm group and the second diaphragm group and cause the first diaphragm group and the second diaphragm group produce sound in two opposite directions at the same time; and a housing that accommodates the loudspeaker wherein the housing comprises:

a sound cavity and two sound output holes disposed at intervals, wherein the loudspeaker and the sound cavity form two independent sound transmission channels, and wherein the two sound output holes are respectively connected to the two sound transmission channels and outside of the loudspeaker assembly.

10. The loudspeaker assembly according to claim 9, wherein the first voice coil and the second voice coil have a same vibration speed.

11. The loudspeaker assembly according to claim 9, wherein the magnetic circuit system comprises a vibration space, wherein the first internal magnetic conductive plate, the internal magnet, and the second internal magnetic conductive plate are directly stacked, wherein the first external magnetic conductive plate, the external magnet, and the second external magnetic conductive plate are directly stacked, wherein the first external magnetic conductive plate is located on a periphery of the first internal magnetic conductive plate, wherein the external magnet is located on a periphery of the internal magnet, wherein the second external magnetic conductive plate is located on a periphery of the second internal magnetic conductive plate, wherein the first external magnetic conductive plate, the first internal magnetic conductive plate, the external magnet, the internal magnet, the second external magnetic conductive plate, and the second internal magnetic conductive plate are spaced from each other by the vibration space, wherein the first voice coil and the second voice coil are located in the vibration space, wherein the first voice coil surrounds a peripheral edge of the second internal magnetic conductive plate and a part of the internal magnet, and wherein the second voice coil surrounds the part of the internal magnet and the first internal magnetic conductive plate.

12. The loudspeaker assembly according to claim 11, wherein the first internal magnetic conductive plate comprises a base plate and side plates connected to a peripheral edge of the base plate, wherein the side plates and the base plate are assembled into a mounting slot, wherein free ends of the side plates extend outside the mounting slot to form the second external magnetic conductive plate parallel to the base plate, wherein the internal magnet and the second internal magnetic conductive plate are directly stacked on a surface of the base plate that is located in the mounting slot, wherein the external magnet is disposed around a periphery of the side plates and is disposed to be spaced from the side plates, and wherein the external magnet and the first external magnetic conductive plate are stacked on a side of the second external magnetic conductive plate that faces away from the second internal magnetic conductive plate.

13. The loudspeaker assembly according to claim 9, wherein a radial size of the first voice coil in a direction perpendicular to the center line is different from a radial size of the second voice coil in the direction perpendicular to the center line.

14. The loudspeaker assembly according to claim 9, wherein the loudspeaker further comprises a bracket for supporting the magnetic circuit system, wherein the bracket comprises a first side surface and a second side surface opposite to the first side surface, wherein the first diaphragm group is fastened to the first side surface, wherein the second diaphragm group is located on the second side surface, wherein abutting protrusions are disposed at intervals on a peripheral edge of a side of the second diaphragm group, wherein the first external magnetic conductive plate, the external magnet, and the second external magnetic conductive plate are positioned between the second side surface of the bracket and the abutting protrusions.

15. The loudspeaker assembly according to claim 14, wherein a plurality of protrusions are disposed at intervals on a peripheral edge of the second side surface, wherein the first voice coil is provided with a first conductor, wherein the second voice coil is provided with a second conductor, wherein end faces of two abutting protrusions of the plurality of protrusions are provided with first terminals, wherein end faces of other two abutting protrusions of the plurality of protrusions have second terminals, and wherein the first terminals and the second terminals are respectively electrically connected to the first conductor of the first voice coil and the second conductor of the second voice coil.

16. The loudspeaker assembly according to claim 9, wherein the first diaphragm group comprises a first diaphragm and a first dome, wherein the first diaphragm comprises a peripheral surround and a first flat membrane surrounded by the peripheral surround, wherein the first dome is stacked on a first side of the first flat membrane, wherein the first voice coil surrounds the first flat membrane and is located on a second side of the first flat membrane, wherein the second diaphragm group comprises a second diaphragm and a second dome, wherein the second diaphragm comprises a second flat membrane, wherein the second dome is stacked on a first side of the second flat membrane, and wherein the second voice coil surrounds the second flat membrane and is located on a second side of the second flat membrane.

17. An electronic device comprising:

a circuit board; and a loudspeaker assembly electrically connected to the circuit board wherein the loudspeaker assembly comprises:

a loudspeaker comprising:

a first diaphragm group comprising a first diaphragm and a first dome, wherein the first diaphragm comprises a peripheral surround and a first flat membrane surrounded by the peripheral surround, and wherein the first dome is stacked on a first side of the first flat membrane;

a second diaphragm group comprising a second diaphragm and a second dome, wherein the second diaphragm comprises a second flat membrane, wherein the second dome is stacked on a first side of the second flat membrane;

a first voice coil disposed on the first diaphragm group, wherein the first voice coil surrounds the first flat membrane and is located on a second side of the first flat membrane;

a second voice coil disposed on the second diaphragm group, wherein the first voice coil is spaced opposite to the second voice coil, wherein the circuit board is electrically connected to the first voice coil and the second voice coil, and wherein the second voice coil surrounds the second flat membrane and is located on a second side of the second flat membrane; and a magnetic circuit system configured to generate a magnetic field comprising a north pole and a south pole, wherein the first voice coil and the second voice coil are at least partially located in the magnetic circuit system, wherein the first voice coil, the second voice coil, and the magnetic circuit system are located between the first diaphragm group and the second diaphragm group, wherein the first diaphragm group, the second diaphragm group, the first voice coil, and the second voice coil are disposed on a same center line, wherein a direction from the north pole to the south pole is an extension direction of the center line, wherein the first voice coil and the second voice coil are configured to have opposite vibration directions at a same moment under an action of the magnetic field, and wherein the first voice coil and the second voice coil are configured to vibrate to respectively provide driving forces for the first diaphragm group and the second diaphragm group and cause the first diaphragm group and the second diaphragm group produce sound in two opposite directions at the same time; and a housing that accommodates the loudspeaker wherein the housing comprises:

a sound cavity and two sound output holes disposed at intervals, wherein the loudspeaker and the sound cavity form two independent sound transmission channels, and wherein the two sound output holes are respectively connected to the two sound transmission channels and outside of the loudspeaker assembly.

18. The electronic device according to claim 17, wherein the first voice coil and the second voice coil have a same vibration speed.

19. The electronic device according to claim 17, wherein a radial size of the first voice coil in a direction perpendicular to the center line is different from a radial size of the second voice coil in the direction perpendicular to the center line.

20. The electronic device according to claim 17, wherein a radial size of the first voice coil in a direction perpendicular to the center line is the same as a radial size of the second voice coil in the direction perpendicular to the center line.

* * * * *